Jan. 30, 1940.                J. W. McNULTY                2,188,370
                              COOLING APPARATUS
                            Filed Sept. 17, 1936
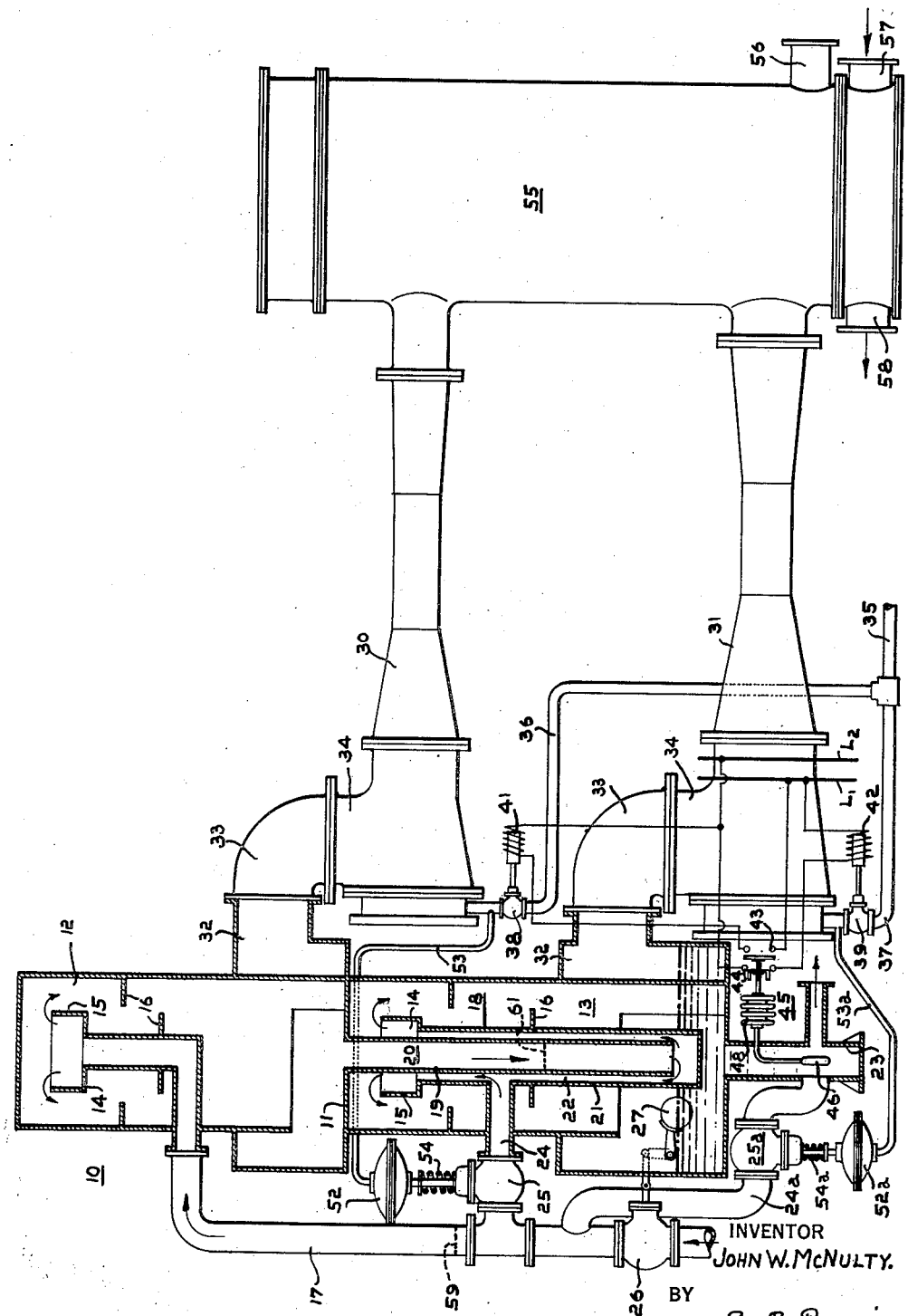
INVENTOR
JOHN W. McNULTY.
BY
a. B. Reavis
ATTORNEY Patented Jan. 30, 1940

2,188,370

UNITED STATES PATENT OFFICE 2,188,370

COOLING APPARATUS

John W. McNulty, Ridley Park, Pa., assignor to Westinghouse Electric & Manufacturing Company, East Pittsburgh, Pa., a corporation of Pennsylvania Application September 17, 1936, Serial No. 101,252

7 Claims. (Cl. 62—152)

My invention relates to refrigerating apparatus, more particularly to vapor jet refrigerating apparatus in which liquid is cooled in stages in a plurality of evaporator chambers, and it has for an object to provide improved means of this character.

A further object is to provide simple and compact apparatus.

Another object is to provide an improved arrangement for partial load operation.

These and other objects are effected by my invention as will be apparent from the following description and claims taken in connection with the accompanying drawing, and forming a part of this application, in which:

The single figure is a diagrammatic view of refrigerating apparatus constructed in accordance with my invention, the evaporator being shown in vertical section.

Referring now to the drawing in detail, I show an evaporator or cold tank 10 having a partition 11 dividing the same into an upper chamber 12 and a lower chamber 13. The present apparatus is designed for cooling the liquid in stages, the liquid first passing through and being partially cooled in the upper chamber 12 and then passing through and being further cooled in the lower chamber 13.

Each chamber is provided with suitable means for causing the liquid to rain or fall therethrough in finely-divided particles. In the present embodiment, such means comprises a cup-shaped receptacle 14 having an annular weir 15 over which the liquid flows. Baffles 16 may be provided below the weir 15 in the path of the falling liquid, so as to break up the liquid into smaller particles and subject the same more thoroughly to the low pressure maintained in the chamber.

The liquid to be cooled is delivered through a supply conduit 17 to the receptacle 14 of the upper chamber 12. The liquid collecting in the bottom of the chamber 12 is conveyed to the lower chamber 13 through conduit means 18 disposed within the lower chamber 13 and arranged to form a loop seal between said chambers. The conduit means or loop seal 18 comprises an inner conduit 19 providing a passage 20 and an outer telescoping conduit 21 providing a passage 22. The passages 20 and 22 communicate at their upper ends with the chambers 12 and 13, respectively, and with each other at their lower ends, the lower end of the conduit 21 being closed and spaced from the lower open end of the inner conduit 19. A discharge or tail pipe 23 is connected to the bottom of the lower chamber 13 for removing the liquid collecting therein. The liquid is then conveyed in any suitable manner, as by conduit means and a pump (not shown), to the point of use and returned to the refrigerating apparatus through the supply conduit 17.

A by-pass conduit 24 is connected to the passage 22, intermediate the upper and lower ends thereof, and to the supply conduit 17. It is provided with a valve 25 adapted to control the flow of liquid therethrough. The by-pass conduit 24 and the portion of the supply conduit 17 connected thereto are disposed below the receptacle 14 of the upper chamber 12, so that, when the valve 25 is open the liquid supplied through the conduit 17 flows through the conduit 24 to the receptacle 14 in the lower chamber 13 and by-passes the upper chamber 12. The supply conduit 17 is provided with a valve 26 actuated by a float 27 in response to the level of the liquid in the bottom of the chamber 13. As the level tends to drop the valve is opened and vice versa, thereby controlling flow of liquid so as to maintain said level substantially constant.

There may also be provided a by-pass conduit 24a connected at one end to the supply conduit 17, preferably below the by-pass conduit 24, and at its other end to the tail pipe 23. The by-pass conduit 24a is provided with a valve 25a, and when said valve is open, the water may flow through said conduit, by-passing both chambers 12 and 13.

The chambers 12 and 13 are provided with suitable fluid translating elements, such as ejectors 30 and 31, respectively, for withdrawing vapor therefrom and for maintaining reduced pressure conditions therein. Each chamber has a vapor outlet nozzle 32 connected through a conduit 33 to the suction inlet 34 of the associated ejector.

Motive fluid, usually steam under suitable pressure, for motivating the ejectors is delivered through a supply conduit 35 and branch conduits 36 and 37. The latter are provided with valves 38 and 39 for controlling the supply of motive fluid individually to the respective chambers. The valves 38 and 39 are adapted to be opened by solenoids 41 and 42, respectively, and the latter are controlled by switches 43 and 44, respectively, of a thermostatic control 45. The latter also includes a thermostatic bulb 46 responsive to the temperature of the cooled water passing through the tail pipe 23 and connected to a bellows 48. The latter is adapted to close the switches 44 and 43 in response to successively higher predetermined temperatures, respectively, and to open said switches in the reverse order upon decrease below said temperatures.

The present invention contemplates a novel means for actuating the valve 25, which is to be closed when the ejector 30 is operating and to be opened when the ejector 30 is shut down. The valve 25 is connected to a diaphragm 52. The pressure of the motive fluid supplied to the ejector, that is, the motive fluid in the conduit 36 beyond the valve 38 is conveyed through a conduit 53 to the diaphragm 52 and imposed thereon in valve closing direction. The valve is biased in open direction by a spring 54. When the valve 38 is opened to admit motive fluid to the ejector 30, the pressure applied to the diaphragm 52 is sufficient to completely close the valve 25, and, when the valve 38 is closed to shut off the supply of motive fluid to the ejector 30, the spring 54 fully opens the valve 25.

The valve 25a is adapted to be fully closed in a similar manner by a diaphragm 52a when subjected to steam pressure supplied to the ejector 31, which pressure is communicated through a conduit 53a as shown. It is adapted to be fully opened by a spring 54a in the absence of pressure on the diaphragm 52a.

The ejectors 30 and 31 discharge into a surface condenser 55 having an air and condensate outlet 56, a cooling water inlet 57 and a cooling water outlet 58. The condenser 55 is of the type known as a simple condenser, that is, the ejectors 30 and 31 discharge into a common condensing space therein. It is to be understood, however, that any suitable form of condensing apparatus may be provided; it may be either a surface condenser or a barometric condenser, and it may be either a simple condenser or a stage condenser having separate compartments connected to the several ejectors.

Operation

Assume first a refrigerating demand sufficiently great to require the operation of both ejectors. Such demand is reflected by a temperature in the tailpipe 23 sufficiently high to cause the thermostat 45 to close both switches, thereby energizing solenoids 41 and 42 and opening the valves 38 and 39. Motive steam is supplied to both ejectors to effect operation thereof. Opening of the valves 38 and 39 causes steam pressure to be communicated through the conduits 53 and 53a to the diaphragms 52 and 52a, on which it acts to close the valves 25 and 25a, respectively.

Full load cooling operation is now effected as follows: Water to be cooled is delivered through the conduit 17 to the receptacle 14 in the upper chamber 12. It overflows the weir 15 and falls through the chamber 12 somewhat in the form of rain. The ejector 30 serves to remove vapor from the chamber 12, thereby maintaining a low pressure or high vacuum therein. This pressure is sufficiently low to cause partial vaporization and consequent cooling of the water.

The water collecting in the bottom of the chamber 12 then flows downwardly through the passage 20, upwardly through the passage 22, over the upper edge of the weir 15, and falls through the lower chamber 13. The ejector 31 removes vapor from the lower chamber 13 and maintains a reduced pressure therein sufficiently low to effect partial vaporization and further temperature reduction of the water falling through the chamber. The water is then removed through the tailpipe 23.

It may be noted that the location of the outlet 32 at the bottom of the evaporator chamber in each case effects progressive cooling of the water to some extent in a manner analogous to counterflow action in heat transfer apparatus. The absolute vapor pressure decreases slightly from the top to the bottom of the chamber, since some pressure drop is necessary to effect flow of the vapor to the outlet. Thus, the water moving downwardly is subjected to progressively lower pressure and is thus progressively cooled to the temperature corresponding to the lowest pressure adjacent the outlet 32. The major portion of the cooling, however, is effected by partial evaporation of the water as it spills over the weir 15.

In the above described operation, the pressure maintained within the chamber 13 is at a lower value than that maintained in the chamber 12, for the reason that the water is at a lower temperature in the chamber 13. This difference in pressure in the two chambers is taken care of by the loop seal 18.

Assume now that the refrigerating demand decreases to a sufficient extent to require the operation of only one ejector. This is reflected by a decrease in the temperature of the water in the tailpipe 23 to a value between the above-mentioned predetermined temperatures at which the switches 44 and 43 are opened and closed. Accordingly, the thermostat 45 opens the switch 43, deenergizing the solenoid 41 and closing the valve 38. The supply of steam to the ejector 30 is shut off so that operation of said ejector is terminated. Condenser pressure is communicated through the ejector 30 to the chamber 12 and as the temperature of vapor at condenser pressure is above the temperature of the water supplied through the conduit 17, heating of water would result if it continued to flow through the chamber 12.

The closing of the valve 38 removes steam pressure from the diaphragm 52, so that the spring 54 opens the valve 25. Water from the supply conduit 17 now flows through the valve 25 and the by-pass conduit 24 directly to the passage 22, thereby by-passing the upper chamber 12; such flow being effected by reason of the fact that the conduit 25 and the portion of the conduit 17 communicating therewith are below the level of the receptacle 14 in the chamber 12. The higher pressure in the chamber 12 causes the water in the conduit 17 to drop to a level approximately that indicated at 59, which is above the connection with the conduit 24 but sufficiently below the upper edge of the weir 15 in the chamber 13 to provide a difference in head for balancing the difference in pressures. The higher pressure in the chamber 12 also causes the water in the passage 20 to drop to a level, such as indicated at 61, such that the difference in head between this level and the upper edge of the weir 15 in the chamber 13 balances the difference in pressures. The level 59 is above the level 61, due to the fact that the pressure of the water in the conduit 17 is higher than that in the loop seal 18, a pressure difference being required to force the water through the valve 25 and the conduit 24.

Partial load operation of apparatus now takes place as follows: Water delivered through the conduit 17 passes through the valve 25, the by-pass conduit 24 and the passage 22 to the upper edge of the weir 15 in the chamber 13. As it falls through the chamber 13, it is partially vaporized and cooled by reason of the action of the ejector 31 in the same manner as described above. It is then removed through the tailpipe 23. The chamber 12 does not contain water at such time, the water therein having been drained into the passage 20. The water levels indicated at 59 and 61 are subjected to the higher temperature of condenser pressure, but inasmuch as this water is in relatively static condition, the amount of heat added to the water is negligible.

Upon further decrease in refrigerating demand, the temperature of the cooled water decreases sufficiently to cause the thermostat 45 to open the switch 44 and terminate operation of the ejector 31, by closing the steam valve 39.

Flow of water through the chamber 13 may result in heating thereof, by reason of condenser vapor pressure communicated through the inactive ejector 31. In such case, the water may be by-passed through the conduit 24a, the valve 25a being opened by the spring 54a when the valve 39 cuts off steam pressure from the diaphragm 52a.

Upon subsequent increase in refrigerating load, the temperature again rises until the thermostat 45 closes the switch 44 to effect partial load operation as described above, and upon further increase, the switch 43 is also closed to effect full load operation.

While I have shown my invention as embodied in apparatus having two evaporator chambers, it is to be understood that it is equally applicable to apparatus having a greater number of evaporator chambers.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of first and second evaporator chambers, first and second ejectors connected to said first and second chambers, respectively, for withdrawing vapor therefrom, means for supplying motive fluid and for controlling the admission thereof individually to said ejectors, means for delivering liquid to be cooled to said first chamber, means for conveying liquid from said first chamber to said second chamber, means for withdrawing liquid from said second chamber, by-pass conduit means for conveying liquid from said delivery means to the second chamber for by-passing the first chamber, a valve in said by-pass conduit, and means for closing said valve in response to pressure of the motive fluid admitted to the first ejector and for opening the valve in the absence of said pressure, whereby when the first ejector is shut down, the liquid to be cooled by-passes the first chamber.

2. In refrigerating apparatus, the combination of first and second evaporator chambers, first and second ejectors connected to said first and second chambers, respectively, for withdrawing vapor therefrom, means for supplying motive fluid to said ejectors, first and second valves for controlling the admission of motive fluid to said first and second ejectors, respectively, means for delivering liquid to be cooled to said first chamber, means for conveying liquid from said first chamber to said second chamber, means for withdrawing liquid from said second chamber, by-pass conduit means for conveying liquid from said delivering means to the second chamber for by-passing the first chamber, a valve in said by-pass conduit, a pressure responsive element for closing the valve in said by-pass conduit, and means directly responsive to opening of said first valve for supplying fluid pressure to said pressure responsive element, whereby when the first ejector is shut down, the liquid to be cooled by-passes the first chamber.

3. In refrigerating apparatus, the combination of first and second evaporator chambers, the first chamber being disposed at a higher level than the second chamber, a fluid translating element connected to each chamber for withdrawing vapor therefrom and maintaining a reduced pressure therein, conduit means for conveying liquid to be cooled to said first chamber, means for conveying liquid from the first chamber to the second chamber, means for withdrawing liquid from the second chamber, by-pass conduit means for conveying liquid from said first-mentioned conduit means to the second chamber, and a valve in said by-pass conduit means, the point of communication between said by-pass conduit means and said first-mentioned conduit means being disposed at a level substantially below the level at which liquid to be cooled is delivered from said first-mentioned conduit means into the reduced pressure region in said first chamber, whereby liquid flows through the by-pass conduit means into the second chamber and by-passes the first chamber when the valve in said by-pass conduit means is open.

4. In refrigerating apparatus, the combination of first and second evaporator chambers, the first chamber being disposed immediately above the second chamber, an ejector connected to each chamber for withdrawing vapor therefrom, means for supplying motive fluid and for controlling the admission thereof individually to said ejectors, conduit means for conveying liquid to be cooled to said first chamber, means for conveying liquid from the first chamber to the second chamber, means for withdrawing liquid from the second chamber, by-pass conduit means for conveying liquid from said first-mentioned conduit means to the second chamber, a valve in said by-pass conduit means, the several conduit means being so arranged that the liquid flows through the by-pass conduit means into the second chamber and by-passes the first chamber when the valve in said by-pass conduit means is open, and means responsive to the pressure of the motive fluid admitted to the ejector of said first chamber for closing said valve.

5. In refrigerating apparatus, the combination of first and second evaporator chambers, the first chamber being disposed immediately above the second chamber, a fluid translating element connected to each chamber for withdrawing vapor therefrom, means for supplying liquid to be cooled to said first chamber, conduit means for conveying liquid from said first chamber to said second chamber and formed to provide a loop seal therebetween, said conduit means comprising a vertical inner conduit communicating at its upper end with said first chamber for flow of liquid downwardly therethrough and an outer conduit closed at its lower end, telescoping the inner conduit and forming therewith a passage communicating at its lower end with the inner conduit and at its upper end with said second chamber for flow of liquid upwardly therethrough, and means for withdrawing liquid from said second chamber.

6. In refrigerating apparatus, the combination of first and second evaporator chambers, the first chamber being disposed immediately above the second chamber, an ejector connected to each chamber for withdrawing vapor therefrom, means for supplying liquid to be cooled to said first chamber, conduit means disposed within the second chamber for conveying liquid from said first chamber to said second chamber and formed to provide a loop seal therebetween, said conduit means comprising a vertical inner conduit communicating at its upper end with said first chamber for flow of liquid downwardly therethrough and an outer conduit, closed at its lower end, telescoping the inner conduit and forming therewith a passage communicating at its lower end with the inner conduit and at its upper end with said second chamber for flow of liquid upwardly therethrough, and means for withdrawing liquid from said second chamber.

7. In refrigerating apparatus, the combination of evaporator means, a plurality of fluid translating elements connected to said evaporator means for withdrawing vapor therefrom, conduit means for conveying liquid to be cooled to said evaporator means, means for withdrawing liquid from said evaporator means, a connection between said conduit means and said withdrawal means by-passing the entire evaporator means, a valve in said connection, means for rendering said fluid translating elements individually active or inactive, means controlled by the last-mentioned means for opening said valve to by-pass liquid from said conduit means to said liquid withdrawal means in response to the action of the last-mentioned means rendering all of said fluid translating elements inactive and for fully closing said valve in response to the action of the last-mentioned means rendering a fluid translating element active.

JOHN W. McNULTY.